United States Patent [19]

Mink et al.

[11] Patent Number: 5,525,678
[45] Date of Patent: Jun. 11, 1996

[54] PROCESS FOR CONTROLLING THE MWD OF A BROAD/BIMODAL RESIN PRODUCED IN A SINGLE REACTOR

[75] Inventors: Robert I. Mink, Warren; Thomas E. Nowlin, West Windsor; Pradeep P. Shirodkar, Somerset; Sandra D. Schregenberger, Neshanic; Grace O. Tsien, Colonia, all of N.J.

[73] Assignee: Mobil Oil Corporation, Fairfax, Va.

[21] Appl. No.: 310,446

[22] Filed: Sep. 22, 1994

[51] Int. Cl.$^6$ .................................................. C08F 4/656
[52] U.S. Cl. .................... 525/246; 525/247; 525/268; 525/270; 525/324; 526/78; 526/80; 526/81; 526/86; 526/92; 526/114; 526/129
[58] Field of Search ................. 526/84, 78, 86, 526/80, 81, 92, 114, 129; 525/246, 270, 324, 247, 268

[56] References Cited

U.S. PATENT DOCUMENTS

| | | | |
|---|---|---|---|
| 3,135,809 | 6/1964 | Bosmajian | 260/650 |
| 3,950,269 | 4/1976 | Setterquist | 252/430 |
| 4,188,470 | 2/1980 | Collina et al. | 526/64 |
| 4,210,559 | 7/1980 | Melquist et al. | 252/431 R |
| 4,299,936 | 11/1981 | Candlin et al. | 526/119 |
| 4,324,691 | 4/1982 | Hartshorn et al. | 252/429 B |
| 4,338,424 | 7/1982 | Morita et al. | 526/65 |
| 4,356,111 | 10/1982 | Shipley et al. | 252/429 B |
| 4,383,939 | 5/1983 | Johnstone | 252/429 B |
| 4,396,533 | 8/1983 | Johnstone | 252/429 B |
| 4,404,344 | 9/1983 | Sinn et al. | 526/160 |
| 4,414,369 | 11/1983 | Kuroda et al. | 526/65 |
| 4,420,592 | 12/1983 | Kato et al. | 526/65 |
| 4,518,751 | 5/1985 | Mizogami et al. | 526/114 |
| 4,525,550 | 6/1985 | Warzelham et al. | 526/116 |
| 4,530,914 | 7/1985 | Ewen et al. | 502/113 |
| 4,536,484 | 8/1985 | Lacombe et al. | 502/62 |
| 4,542,199 | 9/1985 | Kaminsky et al. | 526/160 |
| 4,568,659 | 2/1986 | Warzelhan et al. | 502/111 |
| 4,578,373 | 3/1986 | Graves | 502/113 |
| 4,656,151 | 4/1987 | Shelly et al. | 502/113 |
| 4,658,078 | 4/1987 | Slaugh et al. | 585/512 |
| 4,659,685 | 4/1987 | Coleman, III et al. | 502/113 |
| 4,665,047 | 5/1987 | Slaugh et al. | 502/108 |
| 4,701,432 | 10/1987 | Welborn, Jr. | 502/113 |
| 4,703,094 | 10/1987 | Raufast | 526/65 |
| 4,704,376 | 11/1987 | Blenkers et al. | 502/104 |
| 4,710,552 | 12/1987 | Bachl et al. | 526/116 |
| 4,739,022 | 4/1988 | Blenkers et al. | 526/116 |
| 4,752,597 | 6/1988 | Turner | 502/104 |
| 4,769,510 | 9/1988 | Kaminsky et al. | 585/512 |
| 4,794,090 | 12/1988 | Ewen | 502/117 |
| 4,814,540 | 3/1989 | Watanabe et al. | 585/523 |
| 4,820,786 | 4/1989 | Bacskai | 526/152 |
| 4,871,704 | 10/1989 | Kohara et al. | 502/114 |
| 4,874,734 | 10/1989 | Kioka et al. | 502/104 |
| 4,912,075 | 3/1990 | Chang | 502/107 |
| 4,914,253 | 4/1990 | Chang | 585/523 |
| 4,923,833 | 5/1990 | Kioka et al. | 502/9 |
| 4,925,821 | 5/1990 | Chang | 502/107 |
| 4,931,517 | 6/1990 | Fujita | 526/128 |
| 4,933,403 | 6/1990 | Kaminsky et al. | 526/160 |
| 4,935,397 | 6/1990 | Chang | 502/117 |
| 4,935,474 | 6/1990 | Ewen et al. | 526/114 |
| 4,937,217 | 6/1990 | Chang | 502/111 |
| 4,937,299 | 6/1990 | Ewen et al. | 526/119 |
| 4,937,301 | 6/1990 | Chang | 526/128 |
| 4,939,217 | 7/1990 | Stricklen | 526/114 |
| 4,962,248 | 10/1990 | Winter et al. | 585/12 |
| 4,962,262 | 10/1990 | Winter et al. | 585/512 |
| 5,001,099 | 3/1991 | Shelly | 502/113 |
| 5,001,205 | 3/1991 | Hoel | 526/128 |
| 5,006,500 | 4/1991 | Chang | 502/107 |
| 5,008,228 | 4/1991 | Chang | 502/111 |
| 5,013,701 | 5/1991 | Coosmans et al. | 502/110 |

(List continued on next page.)

FOREIGN PATENT DOCUMENTS

| | | |
|---|---|---|
| 0136029 | 4/1985 | European Pat. Off. . |
| 0516458 | 5/1992 | European Pat. Off. . |
| 0515132 | 5/1992 | European Pat. Off. . |
| 2608863 | 9/1977 | Germany . |
| WO89/02448 | 3/1989 | WIPO . |

OTHER PUBLICATIONS

WPAT Accession No. 89-087558/12 (1989).
Sinn et al., "Living Polymers on Polymerization with Extremely Productive Ziegler Catalysts", Angew. Chem. (1980), pp. 390–392.
Soga et al., "Isotactic Polymerization of Propene With (n–1,1'–ethylenedi–4,5,6,7–tetrahydroindenyl)zirconium dicloride combined with methylaluminoxane", Makromol. Chem., (1987) pp. 305–310.
Kaminsky, Walter, "Bis(cyclopentadienyl)zirkon- -Verbindungen und Aluminoxan als Zeigler Katalysatoren fur die Polymerisation und Copolymerisation von Olefinen" Makromol. Chem., (1983) pp. 417–421.
Kaminsky, Walter, "Influence of hydrogen on the polmerization of ethylene with the homogeneous Ziegler system bis(cyclopentadienyl)zirconiumdichloride/aluminoxane", Makromol. Chem., (1984) pp. 225–228.
Kaminsky, "Metallocene Catalysts", Universitat Hamburg, (1992).

*Primary Examiner*—Romulo H. Delmendo
*Attorney, Agent, or Firm*—Alexander J. McKillop; Malcolm D. Keen; Marina V. Schneller

[57] ABSTRACT

A bimetallic catalyst produces broad or bimodal molecular weight distribution polyolefin resin whose composition depends on the ratio of the concentration of the two metals of the catalyst producing the HMW and LMW components. The bimetallic catalyst produces a broad/bimodal MWD resin whose HMW and LMW components depend on the relative productivity of each of the transition metal sites of the catalyst. Water and/or carbon dioxide are cofed to the polymerization reactor at levels necessary to modify the weight fractions of the HMW and LMW components, thus achieving a target molecular weight distribution, MWD. The invention allows the resin MWD to be adjusted in the reactor. The weight fraction of the high molecular weight component decreases with the addition of the water and or the carbon dioxide and the FI of the overall product increases with a decrease in the HMW component weight fraction in the product.

30 Claims, No Drawings

U.S. PATENT DOCUMENTS

| | | | |
|---|---|---|---|
| 5,023,388 | 6/1991 | Luker | 585/9 |
| 5,026,797 | 6/1991 | Takahashi | 526/124 |
| 5,032,562 | 7/1991 | Lo et al. | 502/111 |
| 5,041,585 | 8/1991 | Deavenport et al. | 556/179 |
| 5,043,515 | 8/1991 | Slaugh et al. | 585/512 |
| 5,055,438 | 10/1991 | Canich | 502/117 |
| 5,057,475 | 10/1991 | Canich et al. | 502/104 |
| 5,064,797 | 11/1991 | Stricklen | 502/111 |
| 5,066,631 | 11/1991 | Sangokoya et al. | 502/152 |
| 5,077,255 | 12/1991 | Welborn, Jr. | 502/104 |
| 5,086,024 | 2/1992 | Crapo et al. | 502/117 |
| 5,086,135 | 2/1992 | Kissin | 526/151 |
| 5,087,788 | 2/1992 | Wu | 585/512 |
| 5,091,352 | 2/1992 | Kioka et al. | 502/103 |
| 5,120,696 | 6/1992 | Tsutsui et al. | 502/113 |
| 5,124,418 | 6/1992 | Welborn, Jr. | 526/114 |
| 5,126,303 | 6/1992 | Resconi et al. | 502/117 |
| 5,132,262 | 7/1992 | Rieger et al. | 502/117 |
| 5,132,381 | 7/1992 | Winter et al. | 526/160 |
| 5,145,818 | 9/1992 | Tsutsui et al. | 502/113 |
| 5,145,819 | 9/1992 | Winter et al. | 502/117 |
| 5,147,949 | 9/1992 | Chang | 526/129 |
| 5,155,187 | 10/1992 | Shelly | 526/116 |
| 5,157,008 | 10/1992 | Sangokoya et al. | 502/111 |
| 5,171,799 | 12/1992 | Kioka et al. | 26/127 |
| 5,171,871 | 12/1992 | Miyashita | 556/27 |
| 5,171,919 | 12/1992 | Watanabe et al. | 585/523 |
| 5,183,867 | 2/1993 | Welborn, Jr. | 526/114 |
| 5,189,000 | 2/1993 | Masi et al. | 502/113 |
| 5,196,496 | 3/1993 | Galimberti et al. | 526/348.6 |
| 5,198,399 | 3/1993 | Hoff et al. | 502/111 |
| 5,206,197 | 4/1993 | Campbell, Jr. | 502/103 |
| 5,206,199 | 4/1993 | Kioka et al. | 502/117 |
| 5,208,304 | 5/1993 | Waymouth | 526/164 |
| 5,216,095 | 6/1993 | Dolle et al. | 526/127 |
| 5,223,465 | 6/1993 | Ueki et al. | 502/117 |
| 5,225,500 | 7/1993 | Elder et al. | 526/127 |
| 5,234,878 | 8/1993 | Tsutsui et al. | 502/103 |
| 5,238,891 | 8/1993 | Miro | 502/104 |
| 5,238,892 | 8/1993 | Chang | 502/111 |
| 5,240,894 | 8/1993 | Burkhardt et al. | 502/108 |
| 5,241,025 | 8/1993 | Hlatky et al. | 526/129 |
| 5,242,876 | 9/1993 | Shamshoum et al. | 502/113 |
| 5,252,529 | 10/1993 | Ueda et al. | 502/113 |
| 5,258,342 | 11/1993 | Luciani et al. | 502/107 |
| 5,266,544 | 11/1993 | Tsutsui et al. | 502/113 |
| 5,296,565 | 3/1994 | Ueda et al. | 526/114 |
| 5,308,816 | 5/1994 | Tsutsui et al. | 502/108 |

PROCESS FOR CONTROLLING THE MWD OF A BROAD/BIMODAL RESIN PRODUCED IN A SINGLE REACTOR

FIELD OF THE INVENTION

The invention relates to a catalyst and a catalytic preparation of bimodal molecular weight distribution polymers and copolymers of ethylene, in one reactor. A cofeed is used to control the proportion of each of the different weight fractions in broad or bimodal molecular weight distribution polyolefin resin product. The bimetallic catalyst produces broad or bimodal molecular weight distribution polyolefin resin, in which there are at least two components; one of the two components has a higher molecular weight (referred herein as HMW) than another of the two components, which is referred herein as LMW, low molecular weight (component). The bimetallic catalyst produces broad or bimodal molecular weight distribution polyolefin resin whose composition depends on the ratio of the concentration of the two metals of the catalyst producing the HMW/LMW components. More specifically, the bimetallic catalyst produces a broad/bimodal MWD resin whose HMW and LMW components depend on the relative productivity of each of the transition metal sites of the catalyst. Water and/or carbon dioxide are cored to the polymerization reactor at levels necessary to modify the weight fractions of the HMW and LMW components, thus achieving target molecular weight distribution, MWD, and average polymer molecular weight as indicated by a change in Flow Index (FI). The invention allows the resin MWD to be adjusted in the reactor. The weight fraction of the high molecular weight component decreases with the addition of the water and/or the carbon dioxide and the flow index of the overall product increases with decrease in the HMW component weight fraction in the product.

BACKGROUND OF THE INVENTION

Some attempts have been made to make broad or bimodal molecular weight distribution polyethylene in two (2) reactors. In U.S. Pat. No. 5,032,562, a bimetallic catalyst system is described that produces broad or bimodal molecular weight distribution polyethylene resins in a single reactor. In that catalyst, the LMW component is produced by the Zr site while the HMW component is produced by the Ti site. The relative productivity of the two transition metal sites determines the weight fraction of the HMW and LMW components in the final product.

The final product is a gel-free intimate mixture of these two components because of the close proximity of the two metal sites in that catalyst. In that product, the weight fractions of the HMW and LMW components in the final product are fixed by the relative concentration of the two metal species in the bimetallic catalyst. It is often desirable to change the weight fraction of either the HMW or LMW components produced by the bimetallic catalyst in the single reactor. Reformulation of the bimetallic catalyst offers one mode of operation, to change the relative weight fraction of one of the two components produced by such a catalyst.

It is an object of the invention, to eliminate time consuming and costly capital investment in employing two reactors in tandem to produce bimodal molecular weight distribution resins of target molecular weight.

It is another object of the invention, to eliminate time consuming catalyst reformulation procedure(s) to alter the concentration and productivity of the two metal sites of the catalyst.

SUMMARY OF THE INVENTION

The invention relates to a catalytic process and a catalytic preparation of bimodal molecular weight distribution polymers and copolymers of ethylene, in one reactor, in the presence of a bimetallic catalyst. A water and/or carbon dioxide feed to the reactor is used to control the proportion of different weight fractions in broad or bimodal molecular weight distribution olefin resin product, produced by the bimetallic catalyst during polymerization or copolymerization.

The bimetallic catalyst contains two different transition metal compounds, each having different hydrogen response characteristics. Because of the different hydrogen response of each of the two sources of transition metal in the bimetallic catalyst, each will produce a different molecular weight component under identical olefin polymerization conditions. In preferred embodiments below, the LMW component is produced by the Zr site while the HMW component is produced by the Ti site.

The bimetallic catalyst produces broad or bimodal molecular weight distribution polyolefin resin whose composition depends on the ratio of the concentration of the two transition metal catalyst components producing the HMW and LMW components. Thus the product of olefin polymerization in the presence of such a catalyst will comprise at least two fractions each of different molecular weight, and one having a relatively high molecular weight (hereinafter HMW) relative to a second fraction of relatively lower molecular weight (LMW).

In that product, the weight fractions of the HMW and LMW components in the final product are fixed by the relative concentration of the two metal species in the bimetallic catalyst.

DETAILED DESCRIPTION OF THE INVENTION

In bimodal molecular weight distribution products, the weight fraction of the HMW component should be in the range of 0.10 to 0.90 for applications requiring broad molecular weight distribution resins. Another measurable property of the bimodal products is flow index, (FI or $I_{21}$, measured at 190° C. in accordance with ASTM D-1238, Condition F.) The FI of the bimodal molecular weight product should be in the range of 2 to 100. If the bimodal molecular weight distribution product has FI of less than 2, FI is too low for processability. On the other hand, if overall polymer FI is too high, then product toughness properties decrease. Hence, it is necessary to control polymer FI in the polymerization reactor. Product MFR values are preferably in the range of 30–250. MFR is defined herein as the ratio of the flow index (FI or $I_{21}$) divided by the melt index, i.e., $$MFR = I_{21}/I_{2.16}$$

Smaller MFR values indicate relatively narrow molecular weight distribution polymers.

Because of the different hydrogen response of each of the two sources of transition metals in the bimetallic catalyst, each will produce a different molecular weight component under identical olefin polymerization conditions. In preferred embodiments below, the metal of highest hydrogen response will be present in amounts of 0.1 to 0.8 weight percent: in preferred embodiments that metal is zirconium. The metal of lowest hydrogen response will be present in amounts of 0.5 to 3.0 weight percent; in preferred embodiments that metal is titanium. This catalytst system of the invention is catalytically effective to produce bimodal molecular weight distribution product containing 0.05 to 0.95 weight percent of the high molecular weight component.

The Process Conditions

Olefins are polymerized with catalysts according to the present invention by any suitable process. Such processes include polymerizations carried out in suspension, in solution or in the gas phase. Gas phase polymerization reactions are preferred, e.g., those taking place in stirred bed reactors and, especially, fluidized bed reactors. The polymerization is carried out at relatively low temperatures, e.g., from about 30° to about 115° C. Preferably, polymerization pressures are less than 10,000 psi, preferably less than 1000 psi, and most prefereably in the range of 100 to 350 psi.

A particularly desirable method for producing polyethylene polymers according to the present invention is in a fluid-bed reactor. Such a reactor and means for operating it are described by Nowlin et al, U.S. Pat. No. 4,481,301, the entire contents of which are incorporated herein by reference. The polymer produced in such a reactor contains the catalyst particles because the catalyst is not separated from the polymer. The molecular weight of the polymer may be controlled in a known manner, e.g., by using hydrogen. With the catalysts produced according to the present invention, molecular weight may be suitably controlled with hydrogen when the polymerization is carried out at relatively low temperatures, e.g., from about 30° to about 105° C. This control of molecular weight may be evidenced by a measurable positive change in melt index ($I_2$) of the polymer produced.

When a fluid-bed reactor is employed, the catalyst modifier of the invention can be introduced separately. The catalyst modifier is added continuously to the reactor. In the presence of the catalyst described below and used in accordance with the invention, water and/or carbon dioxide decrease the weight fraction of the HMW component, with the result that the relative weight fraction of LMW component increases; the effect of decreasing the amount of HMW component is to increase FI of broad or bimodal molecular weight distribution resin. The amount of the catalyst modifier can range from 0.1 to 1000 ppm (based on ethylene), and preferably from 0.1 to 50 ppm (based on ethylene). For example, when $CO_2$ is employed the $CO_2$ feed will range from 0.1 ppm to 50 ppm (based on ethylene); generally, 0.1 to 20 ppm $CO_2$ (based on ethylene) has been employed. The water cofeed can range from 0.1 ppm to 1000 ppm based on ethylene; generally 0.1 to 50 ppm water, based on ethylene, is employed. Although the catalyst modifier can be added separately, it can also be added as a mixture, a cofeed, with ethylene or hydrogen. The presence of the modifier acts to increase FI by at least about 10%. The increase in FI depends on the level of modifier employed and the composition of the catalyst system. Increase in FI can range from 10 to 2000%, preferably 20 to 100% over that of a resin produced in the absense of the modifier.

The linear polyethylene polymers prepared in accordance with the present invention are homopolymers of ethylene or copolymers of ethylene with one or more $C_3$–$C_0$ alpha-olefins. Thus, copolymers having two monomeric units are possible as well as terpolymers having three monomeric units. Particular examples of such polymers include ethylene/1-butene copolymers, ethylene/1-hexene copolymers, ethylene/1-octene copolymers, ethylene/4-methyl-1-pentene copolymers, ethylene/1-butene/1-hexene terpolymers, ethylene/propylene/1-hexene terpolymers and ethylene/propylene/1-butene terpolymers. When propylene is employed as a comonomer, the resulting linear low density polyethylene copolymer preferably has at least one other alpha-olefin comonomer having at least four carbon atoms in an amount of at least 1 percent by weight of the polymer. Accordingly, ethylene/propylene copolymers are possible, but not preferred. The most preferred comonomer is 1-hexene. The linear low density polyethylene polymers produced in accordance with the present invention preferably contain at least about 80 percent by weight of ethylene units.

Bimetallic Catalyst Composition (Component A)

Preferred bimetallic catalysts employed in the process of the invention contain at least two transition metals, one in the form of a metallocene and one transition metal in the form of a non-metallocene, and have an activity of at least about 1000 g polymer/g catalyst or about 50 kg polymer/g of each transition metal. The bimetallic catalysts are free of water.

The catalysts of the invention comprise a cocatalyst comprising an aluminum alkyl compound, such as a trialkyl aluminum, free of alumoxane and free of water, or oxygen-containing oligomers and polymers of the aluminum alkyl compound, and a catalyst precursor comprising a carrier, an alumoxane and at least one metallocene; in one embodiment the catalysts further include a non-metallocene transition metal source.

The carrier material is a solid, particulate, porous, preferably inorganic material, such as an oxide of silicon and/or of aluminum. The carrier material is used in the form of a dry powder having an average particle size of from about 1 micron to about 500 microns, preferably from about 10 microns to about 250 microns. The surface area of the carrier is at least about 3 square meters per gram ($m^2/g$), and preferably at least about 50 $m^2/g$ up to about 350 $m^2/g$. The carrier material should be dry, that is, free of absorbed water. Drying of the carrier material can be effected by heating at about 100° C. to about 1000° C., preferably at about 600° C. When the carrier is silica, it is heated to at least 200° C., preferably about 200° C. to about 850° C. and most preferably at about 600° C. The carrier material must have at least some active hydroxyl (OH) groups to produce the catalyst composition of this invention.

In the most preferred embodiment, the carrier is silica which, prior to the use thereof in the first catalyst synthesis step, has been dehydrated by fluidizing it with nitrogen and heating at about 600° C. for about 4–16 hours to achieve a surface hydroxyl group concentration of about 0.7 millimoles per gram (mmol/g). The silica of the most preferred embodiment is a high surface area, amorphous silica (surface area=300 $m^2/g$; pore volume of about 1.65 $cm^3/g$), and it is a material marketed under the tradenames of Davison 952 or Davison 955 by the Davison Chemical Division of W.R. Grace and Company. The silica is in the form of spherical particles, e.g., as obtained by a spray-drying process. As procured, these silicas are not calcined; and this must be dehydrated, as indicated above.

The catalyst synthesis is undertaken under inert conditions, in the absence of water and of oxygen. The carrier is dispersed in solvent to form a slurry.

The carrier material, having said (OH) groups, is slurried in a non-polar solvent and the resulting slurry is contacted with at least one organomagnesium compound having the empirical formula below. The slurry of the carrier material in the solvent is prepared by introducing the carrier into the solvent, preferably while stirring, and heating the mixture to about 25° to about 70° C., preferably to about 40° to about 60° C. Temperatures here are critical with respect to the non-metallocene transition metal which is subsequently added; that is temperatures in this slurry of about 90° C. result in deactivation of the transition metal added subsequently. Accordingly, all catalyst precursor synthesis steps are conducted below 90° C. The slurry is then contacted with the aforementioned organomagnesium compound, while the heating is continued as indicated.

The organomagnesium compound has the empirical formula

where R and R' are the same or different $C_2$-$C_{12}$ alkyl groups, preferably $C_4$-$C_{10}$ alkyl groups, more preferably $C_4$-$C_8$ alkyl groups, and most preferably both R and R' are mostly n-butyl and sec-butyl groups.

Suitable non-polar solvents, which are liquid at reaction temperatures, are materials in which all of the reactants used herein, i.e., the organomagnesium compound, and the non-metallocene transition metal compound, are at least partially soluble. Preferred non-polar solvents are alkanes, such as isopentane, isohexanes, hexane, n-heptane, octane, nonane, and decane, although a variety of other materials including cycloalkanes, such as cyclohexane, aromatics, such as benzene, toluene and ethylbenzene, may also be employed. The most preferred non-polar solvent is isopentane. Prior to use, the non-polar solvent should be purified, such as by percolation through silica gel and/or molecular sieves, to remove traces of water, oxygen, polar compounds, and other materials capable of adversely affecting catalyst activity.

In the most preferred embodiment of the synthesis of this catalyst it is important to add only such an amount of the organomagnesium compound that will be deposited—physically or chemically—onto the support since any excess of the organomagnesium compound in the solution may react with other synthesis chemicals and precipitate outside of the support. The carrier drying temperature affects the number of sites on the carrier available for the organomagnesium compound—the higher the drying temperature the lower the number of sites. Thus, the exact molar ratio of the organomagnesium compound to the hydroxyl groups will vary and must be determined on a case-by-case basis to assure that only so much of the organomagnesium compound is added to the solution as will be deposited onto the support without leaving any excess of the organomagnesium compound in the solution. Furthermore, it is believed that the molar amount of the organomagnesium compound deposited onto the support may be greater than or less than the molar content of the hydroxyl groups on the support. Thus, the molar ratios given below are intended only as an approximate guideline and the exact amount of the organomagnesium compound in this embodiment must be controlled by the functional limitation discussed above, i.e., it must not be greater than that which can be deposited onto the support. If greater than that amount is added to the solvent, the excess may react with the non-metallocene transition metal compound, thereby forming a precipitate outside of the support which is detrimental in the synthesis of our catalyst and must be avoided. The amount of the organomagnesium compound which is not greater than that deposited onto the support can be determined in any conventional manner, e.g., by adding the organomagnesium compound to the slurry of the carrier in the solvent, while stirring the slurry, until the organomagnesium compound is detected in the solvent.

For example, for the silica carrier heated at about 600° C., the amount of the organomagnesium compound added to the slurry is such that the molar ratio of Mg to the hydroxyl groups (OH) on the solid carrier is about 0.5:1 to about 4:1, preferably about 0.8:1 to about 3:1, more preferably about 0.9:1 to about 2:1 and most preferably about 1:1. The organomagnesium compound dissolves in the non-polar solvent to form a solution from which the organomagnesium compound is deposited onto the carrier.

It is also possible to add such an amount of the organomagesium compound which is in excess of that which will be deposited onto the support, and then remove, e.g., by filtration and washing, any excess of the organomagnesium compound. However, this alternative is less desirable than the most preferred embodiment described above.

The organomagnesium treated support is contacted with an organic alcohol reagent, R"OH, containing R"O— groups which are reactive or capable of displacing alkyl groups on the magnesium. The amount of this organic alcohol reagent is effective to provide a R"OH:Mg ratio of 0.5 to 2.0, preferably 0.8 to 1.5.

Contact of the silica supported magnesium compound, with the organic alcohol reagent is undertaken in the slurry. Contact is undertaken at a temperature ranging from 25° C. to 80° C., preferably 40° C. to 70° C.

The alkyl group in the organic alcohol reagent can contain 1 to 12 carbon atoms, preferably 1 to 8; in the embodiments below, it is an alkyl containing 2 to 4 carbon atoms, particularly of 4 carbon atoms (butyl). The inclusion of the alcohol reagent step in the catalyst synthesis of the invention produces a catalyst which, relative to the absence of this step, is much more active, requires much less non-metallocene transition metal and provides a more active metallocene-transition metal component in the bimetallic catalyst.

After the addition of the organic alcohol reagent to the slurry is completed, the slurry is contacted with a non-metallocene transition metal compound, free of substituted or unsubstituted cyclopentadienyl groups. The slurry temperature must be maintained at about 25° to about 70° C., preferably to about 40° to about 60° C. As noted above, temperatures in this slurry of about 80° C. or greater may result in deactivation of the non-metallocene transition metal. Suitable non-metallocene transition metal compounds used herein are compounds of metals of Groups 4, and 5, of the Periodic Chart of the Elements, as published by Chemical and Engineering News, 63(5), 27, 1985, providing that such compounds are soluble in the non-polar solvents. Non-limiting examples of such compounds are titanium and vanadium halides, e.g., titanium tetrachloride, $TiCl_4$, vanadium tetrachloride, $VCl_4$, vanadium oxytrichloride, $VOCl_3$, titanium and vanadium alkoxides, wherein the alkoxide moiety has a branched or unbranched alkyl radical of 1 to about 20 carbon atoms, preferably 1 to about 6 carbon atoms. The preferred transition metal compounds are titanium compounds, preferably tetravalent titanium compounds. The most preferred titanium compound is titanium tetrachloride. The amount of titanium or vanadium, in non-metallocene compound ranges from a Ti/Mg molar ratio of 0.3 to 1.0, preferably from 0.50 to 0.80.

Mixtures of such non-metallocene transition metal compounds may also be used and generally no restrictions are imposed on the transition metal compounds which may be included. Any transition metal compound that may be used alone may also be used in conjunction with other transition metal compounds.

After the addition of the non-metallocene transition metal compound is complete, the slurry solvent is removed by evaporation or filtering to obtain a free-flowing powder. Next, incorporation of the metallocene can be undertaken. The metallocene is activated with an alumoxane.

The metallocene compound has the formula $Cp_xMA_yB_z$ in which Cp is an unsubstituted or substituted cyclopentadienyl group, M is zirconium or hafnium and A and B belong to the group including a halogen atom, hydrogen atom or an alkyl group. In the above formula of the metallocene compound, the preferred transition metal atom M is zirconium. In the above formula of the metallocene compound, the Cp group is an unsubstituted, a mono- or a polysubstituted cyclopentadienyl group: and x is at least 1. The substituents on the cyclopentadienyl group can be preferably straight-chain $C_1$–$C_6$ alkyl groups. The cyclopentadienyl group can be also a part of a bicyclic or a tricyclic moiety such as indenyl, tetrahydroindenyl, fluorenyl or a partially hydrogenated fluorenyl group, as well as a part of a substituted bicyclic or tricyclic moiety. In the case when x in the above formula of the metallocene compound is equal to 2, the cyclopentadienyl groups can be also bridged by polymethylene or dialkylsilane groups, such as —$CH_2$—, —$CH_2$—$CH_2$—, —CR'R"— and —CR'R"—CR'R"— where R' and R" are short alkyl groups or hydrogen atoms, —$Si(CH_3)_2$—, $Si(CH_3)_2$—$CH_2$—$CH_2$—$Si(CH_3)_2$— and similar bridge groups. The A and B substituents in the above formula of the metallocene compound may be halogen atoms; and y+z is 3 or less, provided that x+y+z equals the valence of M. If the substituents A and B in the above formula of the metallocene compound are alkyl groups, they are preferably straight-chain or branched $C_1$–$C_8$ alkyl groups, such as methyl, ethyl, n-propyl, isopropyl, n-butyl, isobutyl, n-pentyl, n-hexyl or n-octyl.

Suitable metallocene compounds include bis(cyclopentadienyl)metal dihalides, bis(cyclopentadienyl)metal hydridohalides, bis(cyclopentadienyl)metal monoalkyl monohalides, bis(cyclopentadienyl)metal dialkyls and bis(indenyl)metal dihalides wherein the metal is zirconium or hafnium, halide groups are preferably chlorine and the alkyl groups are $C_1$–$C_6$ alkyls. Illustrative, but non-limiting examples of metallocenes include bis(cyclopentadienyl)zirconium dichloride, bis(cyclopentadienyl)hafnium dichloride, bis(cyclopentadienyl)zirconium dimethyl, bis(cyclopentadienyl)hafnium dimethyl, bis(cyclopentadienyl)zirconium hydridochloride, bis(cyclopentadienyl)hafnium hydridochloride, bis(n-butylcyclopentadienyl)zirconium dichloride, bis(n-butylcyclopentadienyl)hafnium dichloride, bis(n-butylcyclopentadienyl)zirconium dimethyl, bis(n-butylcyclopentadienyl)hafnium dimethyl, bis(n-butylcyclopentadienyl)zirconium hydridochloride, bis(n-butylcyclopentadienyl)hafnium hydridochloride, bis-(dimethylcyclopentadienyl)zirconium dichloride, bis(pentamethylcyclopentadienyl)zirconium dichloride, bis(pentamethylcyclopentadienyl)hafnium dichloride, bis(n-butylcyclopentadienyl)zirconium dichloride, cyclopentadienylzirconium trichloride, bis(indenyl)zirconium dichloride, bis(4,5,6,7-tetrahydro-1-indenyl)zirconium dichloride, and ethylene-[bis(4,5,6,7-tetrahydro-1-indenyl)] zirconium dichloride. The metallocene compounds utilized within the embodiment of this art can be used as crystalline solids, as solutions or in a supported form.

The alumoxane can be impregnated into the carrier at any stage of the process of catalyst preparation. In this embodiment, the amount of Al, provided by alumoxane, is sufficient to provide an Al:transition metal (provided by metallocene) molar ratio ranging from 50 to 500, preferably 75 to 300.

The class of alumoxanes comprises oligomeric linear and/or cyclic alkylalumoxanes represented by the formula: R—$(Al(R)—O)_n$—$AlR_2$ for oligomeric, linear alumoxanes and $(—Al(R)—O—)_m$ for oligomeric cyclic alumoxane wherein n is 1–40, preferably 10–20, m is 3–40, preferably 3–20 and R is a $C_1$–$C_8$ alkyl group and preferably methyl to provide methylalumoxane (MAO). MAO is a mixture of oligomers with a very wide distribution of molecular weights and usually with an average molecular weight of about 1200. MAO is typically kept in solution in toluene. The MAO solutions remain liquid at fluid-bed reactor temperatures.

Incorporation of the metallocene component onto the carrier can be accomplished in various ways. Incorporation of either or both the alumoxane and the metallocene compound can be into the slurry resulting from the addition, i.e. after the addition, of the non-metallocene transition metal. The alumoxane and metallocene can be added in any order, or together, to that slurry or to the isolated intermediate of that slurry.

Alternatively, and in accordance with the unique method of infusion of alumoxane into the pores of the carrier, the carrier slurry can be stripped of solvent, after the addition of the non-metallocene transition metal compound, to form a free-flowing powder. The free flowing powder can then be impregnated by determining the pore volume of the carrier and providing an alumoxane (or metallocene-alumoxane) solution in a volume equal to or less than the total pore volume of the carrier, and recovering a dry catalyst precursor. The resulting free-flowing powder, referred to herein as a catalyst precursor, is combined with an activator (sometimes referred as a cocatalyst).

The volume of the solution comprising a solid atumoxane and a solvent therefor can vary. In a preferred embodiment, of alumoxane incorporation into the carrier, one of the controlling factors in the alumoxane incorporation into the carrier material catalyst synthesis is the pore volume of the silica. In this preferred embodiment, the process of impregnating the carrier material is by infusion of the alumoxane solution, without forming a slurry of the carrier material, such as silica, in the alumoxane solution. The volume of the solution of the alumoxane is sufficient to fill the pores of the carrier material without forming a slurry in which the volume of the solution exceeds the pore volume of the silica; accordingly and preferably, the maximum volume of the alumoxane solution is, does not exceed, the total pore volume of the carrier material sample. That maximum volume of the alumoxane solution insures that no slurry of silica is formed. Accordingly, if the pore volume of the carrier material is 1.65 $cm^3$/g, then the volume of alumoxane will be equal to or less than 1.65 $cm^3$/g of carrier material. As a result of this proviso, the impregnated carrier material will appear dry immediatedly following impregnation although the pores of the carrier will be filled with inter alia solvent.

Solvent may be removed from the alumoxane impregnated pores of the carrier material by heating and/or under a positive pressure induced by an inert gas, such as nitrogen. If employed, the conditions in this step are controlled to reduce, if not to eliminate, agglomeration of impregnated carrier particles and/or crosslinking of the alumoxane. In this step, solvent can be removed by evaporation effected at relatively low elevated temperatures of above about 40° C. and below about 50° C. to obviate agglomeration of catalyst particles and crosslinking of the alumoxane. Although solvent can be removed by evaporation at relatively higher temperatures than that defined by the range above 40° C. and below about 50° C., very short heating times schedules must be employed to obviate agglomeration of catalyst particles and crosslinking of the alumoxane.

In a preferred embodiment, the metallocene is added to the solution of the alumoxane prior to impregnating the carrier with the solution. Again, as noted above, the maximum volume of the alumoxane solution also including the metallocene is the total pore volume of the carrier material sample. The molar ratio of alumoxane provided aluminum, expressed as Al, to metallocene metal, expressed as M (e.g. Zr), ranges from 50 to 500, preferably 75 to 300, and most preferably 100 to 200. An added advantage of the present invention is that this Al:Zr ratio can be directly controlled. In a preferred embodiment the alumoxane and metallocene compound are mixed together at a temperature of about 20° to 80° C., for 0.1 to 6.0 hours, prior to use in the infusion step. The solvent for the metallocene and alumoxane can be appropriate solvents, such as aromatic hydrocarbons, halogenated aromatic hydrocarbons, ethers, cyclic ethers or esters, preferably it is toluene.

The catalyst precursor component formed from the organomagnesium compound, the non-metallocene transition metal and the activated metallocene, must now be activated with a cocatalyst, which is an alkyl aluminum compound, free of water and free of oxygen-containing oligomers.

The cocatalyst can be a trialkylaluminum, free of an alumoxane. Preferably, trimethylaluminum (TMA) is the cocatalyst or activator. The amount of the TMA activator is sufficient to give an Al:Ti molar ratio of about 10:1 to about 1000:1, preferably about 15:1 to about 300:1, and most preferably about 20:1 to about 100:1. The catalyst exhibits high activity for long periods of time, and exhibits little deactivation.

The catalyst precursor of this invention comprises a metallocene compound and an alumoxane which is fed to the fluid bed reactor for gas phase polymerizations and copolymerizations of ethylene in particulate form. Moreover, in accordance with the invention, the cocatalyst or activator is fed to the fluid-bed reactor for polymerizations and copolymerizations of ethylene in the absence of alumoxane solution.

The Make-Up Catalyst Composition (Component B)

The minor component of the catalyst system of the invention comprises one of the two different sources of transition metals, which are contained in the major component of the catalyst system; it is effective to increase the amount of one of the two polymer components, HMW or LMW; and to alter polymer FI and MFR values. In embodiments below, it is effective to increase FI and MFR. The minor component of the catalyst system comprises only 0.1% to 30%, preferably 1% to 15% of the catalyst system. The minor component will itself contain 0.1 to 3 weight percent of the transition metal.

The effect of water and/or carbon dioxide can be augmented by adding the make-up catalyst used in the invention. The make-up catalyst comprises a carrier, an alumoxane and at least one metallocene. It is free-flowing and particulate in form comprising dry powder particles having a particle size of from about 1 micron to about 250 microns, preferably from about 10 microns to about 150 microns. The catalyst which contains only one transition metal in the form of a metallocene has an activity of at least about 50 kg polymer/g of transition metal. The alumoxane and metallocene loading on the carrier is such that the amount of aluminum, (elemental basis) provided by the alumoxane, on the carrier ranges from 1 to 40 weight percent, preferably from 5 to 30 weight percent, and most preferably from 5 to 15 weight percent. The optimum MAO loading is in the range of 3 to 15 mmol of Al per gram of silica carrier; if a silica carrier is overloaded with MAO, the catalyst activity is lower and the catalyst particles agglomerate with attendant problems of transferring the catalyst.

In the make-up catalyst the amount of metallocene on the carrier ranges, on a transition metal elemental basis, from 0.001 to 10 weight percent, preferably from 0.05 to 0.4, and most preferably from 0.05 to 0.2 weight percent. Accordingly the ratio of Al:Zr (on an elemental basis) in the catalyst can range from 25 to 10,000, usually within the range of from 70 to 980 but preferably from about 70 to 350, and most preferably from 100 to 200.

The carrier material is a solid, particulate, porous, preferably inorganic material, such as an oxide of silicon and/or of aluminum. In the most preferred embodiment, the carrier is silica in the form of spherical particles, e.g., as obtained by a spray-drying process. The carrier material is used in the form of a dry powder having a particle size of from about 1 micron to about 500 microns, preferably from from about 1 micron to about 250 microns, and most preferably about 10 microns to about 150 microns. The final catalyst containing carrier material may be sieved to insure elimination of large catalyst particles. Presently, elimination of catalyst particles that have a particle size of greater than 500 microns is envisaged. Preferably, elimination of particles of greater than 250 micron particle size, and, most preferably, elimination of particles of greater than 150 micron particle size is undertaken. Sieving of the material may be undertaken after impregnation of the carrier with the metallocene and the alumoxane to eliminate reactor hot spots, thereby to insure reactor continuity, particularly in the gas phase fluid-bed process.

The surface area of the carrier is at least about 3 square meters per gram ($m^2/g$), preferably, 5 to 1200 square meters per gram ($m^2/g$) and most preferably at least about 50 $m^2/g$ up to about 350 $m^2/g$. The pore volume of the carrier will range from 0.1 to 5 $cm^3/g$, preferably from 0.1 to 3.5 $cm^3/g$. The carrier material should be dry, that is, free of absorbed water.

Preferably, the carrier is silica, which contains [OH] groups. The carrier material must have at least some active hydroxyl (OH) groups to produce the catalyst composition of this invention. The hydroxyl group concentration will be at least about 0.7 mmol/g silica. Preferably, the hydroxyl group concentration of the silica will range from 1.6 to 2.5 mmole/g silica. This range is favored by lower drying, dehydration and/or calcination temperatures.

The silica hydroxyl (herein silanol, silica hydroxyl is used interchangeably) groups are detectable by IR spectroscopy. Quantitative determinations of the hydroxyl concentration on silica are made by contacting a silica sample with methylmagnesium iodide and measuring methane evolution (by pressure determination).

Dehydration of silica material can be effected by heating at about 100° C. to about 600° C., preferably from about 150° C. to about 300° C. and most preferably at about 250° C.

By comparison, silica dehydrated at 600° C. (for about 4–16 hours) will have a surface hydroxyl concentration of about 0.7 mmol/g of silica. Silica dehydrated at 800° C. will be a silica with 0.5 mmole of silica hydroxy per gram silica. The silica of the most preferred embodiment is a high surface area, amorphous silica (surface area=300 m²/g; pore volume of 1.65 cm³/g), and it is a material marketed under the tradenames of Davison 952 or Davison 955 by the Davison Chemical Division of W. R. Grace and Company. As purchased, the silicas are not dehydrated and must be dehydrated prior to use.

The amount of hydroxyl groups, in mmol/g silica can be affected by the dehydration temperatures used to condition the silica. The dehydration temperature of about 250° C. increases the amount of reactive hydroxyl groups available for contact with the solution of alumoxane and metallocene, relative to the silica heat-treated, for dehydration purposes to 600° C. Thus it has been found that the catalyst made with the silica subjected to dehydration temperatures of 250° C. is more active than a catalyst produced with the silica subjected to drying temperatures of 600° C. Accordingly, preferred dehydration and/or calcination temperatures are below 400° C., more preferably below 300° C., and most preferably at about 250° C. Accordingly, the silica used in embodiments of the invention will contain a silanol (OH) concentration of greater than 0.7 mmol OH per gram silica; preferably it will contain greater than 0.7 mmol up to 2.5 mmol OH per gram of silica. In preferred embodiments, the concentration ranges from 1.6 to 1.9 mmol/g silica.

To form catalysts of the invention, all catalyst components can be dissolved with alumoxane and impregnated into the carrier. Catalyst preparation is undertaken under anhydrous conditions and in the absence of oxygen. In a unique process, the carrier material is impregnated with alumoxane, preferably methylalumoxane (MAO), in a process described below. The class of alumoxanes comprises oligomeric linear and/or cyclic alkylalumoxanes represented by the formula: R—(Al(R)—O)$_n$—AlR$_2$ for oligomeric, linear alumoxanes and (—Al(R)—O—)$_m$ for oligomeric cyclic alumoxane wherein n is 1–40, preferably 10–20, m is 3–40, preferably 3–20 and R is a $C_1$–$C_8$ alkyl group and preferably methyl. MAO is a mixture of oligomers with a very wide distribution of molecular weights and usually with an average molecular weight of about 1200. MAO is typically kept in solution in toluene.

The volume of the solution comprising an alumoxane and a solvent therefore can vary, depending on the catalyst sought to be produced. In a preferred embodiment of alumoxane incorporation into the carrier, one of the controlling factors in the alumoxane incorporation into the carrier material during catalyst synthesis is the pore volume of the silica. In this preferred embodiment, the process of impregnating the carrier material is by infusion of the alumoxane solution, without forming a slurry of the carrier material, such as silica, in the alumoxane solution. This is undertaken with agitation. The volume of the solution of the alumoxane is sufficient to fill the pores of the carrier material without forming a slurry in which the volume of the solution exceeds the pore volume of the silica; accordingly and preferably, the maximum volume of the alumoxane solution is, does not exceed, the total pore volume of the carrier material sample. That maximum volume of the alumoxane solution insures that no slurry of silica in solvent is formed in this step. By way of example, if the pore volume of the carrier material is 1.65 cc/g, then the volume of alumoxane will be equal to or less than 1.65 cc/g of carrier material. Thus, the maximum volume of solution (of metallocene and alumoxane) will equal the total pore volume of the carrier, e.g. silica, which is the pore volume in, e.g., cc/g, times the total weight of the carrier used. As a result of this provision, the impregnated carrier material will appear dry immediately following impregnation although the pores of the carrier may be filled with inter alia solvent. However, it has been noted that the solution volume can be up to 30% greater than the total pore volume of the silica with the result(s) that no slurry of the silica is formed and that the silica remains dry in appearance. The preferred solvent for the alumoxane, e.g. methylalumoxane, is toluene.

Solvent may be removed from the alumoxane impregnated pores of the carrier material by heating under a vacuum and/or purged with heating in an inert gas, such as nitrogen. If elevated temperature is employed, the temperature conditions in this step are controlled to reduce, if not to eliminate, agglomeration of impregnated carrier particles and/or crosslinking of the alumoxane. In this step, solvent can be removed by evaporation effected at relatively low elevated temperatures of above about 40° and below about 50° to obviate agglomeration of catalyst particles and crosslinking of the alumoxane. Preferably drying is undertaken at 45° C. or less for 5 to 7 hours. Although solvent can be removed by evaporation at relatively higher temperatures than that defined by the range above 40° and below about 50° C., very short heating times schedules must be employed to obviate agglomeration of catalyst particles and crosslinking of the alumoxane, with reduction of catalyst activity. Accordingly, an active catalyst has been produced at evaporation temperature of 110° C. (at extremely short heating times), whereas at 45° C., drying can be undertaken for periods of 24 hours.

In a preferred embodiment, the metallocene is added to the solution of the alumoxane prior to impregnating the carrier with the solution. Again the maximum volume of the alumoxane solution also containing the metallocene is the total pore volume of the carrier material sample. The molar ratio of aluminum provided by alumoxane, expressed as Al, to metallocene metal expressed as M (e.g. Zr), ranges from 50 to 500, preferably 75 to 300, and most preferably 100 to 200. An added advantage of the present invention is that this Al:Zr ratio can be directly controlled. In a preferred embodiment the alumoxane and metallocene compound are mixed together at ambient temperature for 0.1 to 6.0 hours, prior to use in the infusion step. The solvent for the metallocene and alumoxane can be appropriate solvents, such as aromatic hydrocarbons, halogenated aromatic hydrocarbons, ethers, cyclic ethers or esters; preferably it is toluene.

The metallocene compound has the formula $Cp_mMA_nB_p$ in which Cp is an unsubstituted or substituted cyclopentadienyl group, M is zirconium or hafnium and A and B belong to the group including a halogen atom, hydrogen or an alkyl group. In the above formula of the metallocene compound, the preferred transition metal atom M is zirconium. In the above formula of the metallocene compound, the Cp group is an unsubstituted, a mono- or a polysubstituted cyclopentadienyl group. The substituents on the cyclopentadienyl group can be preferably straight-or branched chain $C_1$–$C_6$ alkyl groups. The cyclopentadienyl group can be also a part of a bicyclic or a tricyclic moiety such as indenyl, tetrahydroindenyl, fluorenyl or a partially hydrogenated fluorenyl group, as well as a part of a substituted bicyclic or tricyclic moiety. In the case when m in the above formula of the metallocene compound is equal to 2, the cyclopentadienyl groups can be also bridged by polymethylene or dialkylsilane groups, such as —$CH_2$—, —$CH_2$—$CH_2$—, —CR'R"— and —CR'R"—CR'R"— where R' and R" are short alkyl groups or hydrogen, —$Si(CH_3)_2$—, $Si(CH_3)_2$—$CH2$—$CH_2$—$Si(CH_3)_2$— and similar bridge groups. The A and B substituents in the above formula of the metallocene compound are halogen atoms. If the substituents A and B in the above formula of the metallocene compound are alkyl groups, they are preferably straight-chain or branched $C_1$–$C_8$ alkyl groups, such as methyl, ethyl, n-propyl, isopropyl, n-butyl, isobutyl, n-pentyl, n-hexyl or n-octyl.

Suitable metallocene compounds include bis(cyclopentadienyl)metal dihalides, bis(cyclopentadienyl)metal hydridohalides, his (cyclopentadienyl)metal monoalkyl monohalides, bis(cyclopentadienyl)metal dialkyls and bis(indenyl)metal dihalides wherein the metal is zirconium or hafnium, halide groups are preferably chlorine and the alkyl groups are $C_1$–$C_6$ alkyls. Illustrative, but non-limiting examples of metallocenes include bis(cyclopentadienyl)zirconium dichloride, bis(cyclopentadienyl)hafnium dichloride, bis(cyclopentadienyl)zirconium dimethyl, bis(cyclopentadienyl)hafnium dimethyl, bis(cyclopentadienyl)zirconium hydridochloride, bis(cyclopentadienyl)hafnium hydridochloride, bis(n-butylcyclopentadienyl) zirconium dichloride (BuCp$_2$ZrCl$_2$), bis(n-butylcyclopentadienyl)hafnium dichloride, bis(n-butylcyclopentadienyl) zirconium dimethyl, bis(n-butylcyclopentadienyl)hafnium dimethyl, bis(n-butylcyclopentadienyl)zirconium hydridochloride, bis(n-butylcyclopentadienyl)hafnium hydridochloride, bis(dimethylcyclopentadienyl)zirconium dichloride, bis(pentamethylcyclopentadienyl)zirconium dichloride, bis(pentamethylcyclopentadienyl)hafnium dichloride, bis(n-butylcyclopentadienyl)zirconium dichloride, cyclopentadienylzirconium trichloride, bis(indenyl)zirconium dichloride, bis(4,5,6,7-tetrahydro-1-indenyl)zirconium dichloride, and ethylene-[bis(4,5,6,7-tetrahydro-1-indenyl)]zirconium dichloride. The metallocene compounds utilized within the embodiment of this art can be used as crystalline solids, as solutions or in a supported form.

Products

The polyolefin resin products of the invention can be low density products of densities of less than 0.94 g/cc. Preferably, the products are high density products with densities of greater than about 0.94. The products are broad or bimodal molecular weight distribution products which contain 0.10 to 0.90, preferably 0.30 to 0.70, most preferably 0.50 to 0.65 weight percent of the high molecular weight component.

The film products exhibit excellent Dart Drop Impact strength (DDI) as measured by ASTM D 1709. The products exhibit DDI in the range of 150 to 800 q, preferably from 300 to 800 g and most preferably from 400 to 800 g for a nominal 1 mil gauge film.

The resins resulting from the process of the invention exhibit FI values of 2 to 100, depending upon product application. The FI is a measure of a resin's viscosity which relates to its processability. Increase in resin FI means lower viscosity which improves processability. However, there is generally a trade-off with properties. Typically, as FI values increase, properties deteriorate. For most product applications, there is an optimum FI value for maximized processability and properties, which also depends upon MWD.

EXAMPLES

Example 1

This example is described in Ser. No. 08/151,664 filed Nov. 15, 1993 (now abandoned), which was refiled as Ser. No. 08/443,824 on May 18, 1995.

(A) Titanium Catalyst Component Preparation. 425 gram of Davison grade 955[600° C. calcination temperature] silica was weighed into a two-gallon stainless steel autoclave containing a stirring paddle. Next, ca. 4.8 liter of dry isopentane was added to the autoclave and the stirring rate was set at 100 rpm. The temperature of the silica/isopentane slurry was 54°–58° C. Next, 406 ml of dibutylmagnesium (0.754 mmol/ml) was added to the slurry. The contents of the autoclave were stirred for 60 minutes. Then, 33.6 ml of neat 1-butanol were added and stirring was continued for one hour. Finally, 20.1 ml of titanium tetrachloride was added to the autoclave and stirring continued for 60 minutes. After this time, all solvents were removed by evaporation under a nitrogen purge. Catalyst yield was 496 grams of a white free-flowing powder. Ti found 1.60 wt. %; Mg found 1.37 wt. %.

Example 2

This example is described in Ser. No. 08/151,664 filed Nov. 15, 1993.

Solution B: 8.98 gram of (BuCp)$_2$ZrCl$_2$ was transferred to a one-liter bottle and 467 ml of a 4.75 Molar Al (14.1 wt. % Al) solution of methylalumoxane was added. The bottle was shaken for about one minute to form a yellow solution which was transferred into a 1.5 liter stainless steel hoke bomb and used immediately as described below.

Under an inert atmosphere, 317 gram of the titanium-containing catalyst described in Example 1 was added to a 2-gallon, glass-reactor vessel containing a helical stirrer to agitate the catalyst powder and a temperature jacket which was set at about 30° C. The stirrer was set at 125 rpm. Then, the contents of the hoke bomb (solution B) was added to the titanium-containing catalyst in approximately 5–10 ml aliquots every 30–60 seconds over a 55 minute period. The total volume of solution (B) used was such that the titanium containing catalyst always appeared "dry" during the entire addition time. However, during this addition time, the white titanium-containing catalyst turned a dark brown color. After the addition of solution (B) was complete, the jacket temperature was set at 45° C. and the residual toluene was removed with a nitrogen purge for 5 hrs. After this time the catalyst was a dark brown free-flowing powder. Analytical results: Mg, 0.85 wt. %; Ti, 1.04 wt. %; Al, 13.1 wt. % and Zr, 0.40 wt. %.

These examples are described in Ser. No. 08/141,911 filed Oct. 22, 1993 (now abandoned), which was refiled as Ser. No. 08/494,654 on Jun. 26, 1995.

Example 3

493 g of silica (Davison 955), dehydrated at 250° C., was reacted with a solution of 6.986 g of (BuCp)$_2$ZrCl$_2$ dissolved in 670 gram of MAO in toluene. Gas evolution was observed. The addition of the solution was similar to that described in Example 2. The MAO solution contained 13.7 wt. % Al. The Al/Zr molar ratio was 200:1. The catalyst was dried under flowing N$_2$ at 45° C. for 5 hours. The catalyst contained 9.2 wt. % Al and 0.17 wt. % Zr.

Example 4 was prepared in the same manner as Example 1 using 517 gram of silica, 522 ml of dibutylmagnesium (DBM) (0.713 Molar in Mg), 51.5 ml of 1-butanol and 20.4 ml of titanium tetrachloride.

Example 5 was prepared in the same manner as Example 2 using 272 gram of the titanium-containing product prepared in Example 4, 7.70 gram of (BuCp)2ZrCl$_2$ added to 408 ml of methylalumoxane (13.7 wt % Al).

Example 6 was prepared in the same manner as Example 1 using 458 gram of silica, 462.5 ml of DBM (0.713 Molar in Mg), 28.7 ml of 1-butanol and 19.9 ml of titanium tetrachloride.

Example 7 was prepared in the same manner as Example 2 using 554 gram of the titanium-containing product prepared in Example 6, 15.69 gram of $(BuCp)_2ZrCl_2$ added to 830 ml of Methylalumoxane (13.7 wt% Al).

Example 8

Ethylene/1-hexene copolymers were prepared with the bimetallic catalyst systems in a laboratory slurry reactor. The bimetallic catalyst system of Example 5 was tested with and without water in the reactor.

A 1.6 liter stainless steel autoclave under a slow nitrogen purge at 50° C. was filled with 750 ml of dry heptane and 30 ml of dry 1-hexene, followed by the addition of 4.0 mmol of TMA and 2.8 mmol of $H_2O$. The stirring speed was set at 1000 rpm and the internal temperature was increased to 95° C. The internal pressure was raised 6 psi with hydrogen. Ethylene was introduced to maintain the pressure at about 210 psig. The internal temperature was decreased to 85° C., 23.8 mg of bimetallic catalyst precursor of Example 5 was introduced into the reactor with ethylene over-pressure, and the internal temperature was increased and held at 95° C. The polymerization was continued for 60 minutes, then the ethylene supply was stopped, and the reactor was cooled to ambient temperature. The polyethylene was collected and dried. Yield of resin was 62.1 g.

A significantly higher resin flow index at a significantly higher catalyst productivity resulted in the presence of water.

| Water mmol | Flow Index | % Increase in FI | MFR | Productivity g/g–h |
|---|---|---|---|---|
| 0 | 2.1 | — | 43 | 1670 |
| 2.8 | 39.4 | 1776 | 150 | 2610 |

Vapor phase hydrogen/ethylene molar ratio ($H_2/C_2$) was equal to 0.035 and ethylene partial pressure was equal to 185–188 psi.

Example 9

Polymerization in gas-phase fluid bed reactor. This example illustrates the effect of cofeeding $H_2O$ with the bimetallic catalyst of Example 7. A decrease in HMW fraction (XHMW) and a higher resin FI value were obtained with cofeeding $H_2O$.

| $H_2O$, ppm* | Density (g/cc) | FI | % Increase in FI | MFR | XHMW | Cat. Productivity (lb/lb) |
|---|---|---|---|---|---|---|
| 0 | 0.938 | 4.7 | 0 | 71 | 0.68 | 3000 |
| 5–10 | 0.940 | 7.6 | 62 | 91 | 0.66–0.67 | 3180 |

Theoretical estimates based on ethylene feed. Constant: Reactor Temperature=90° C., Ethylene Partial Pressure=190 psi, $H^2/C_2$=0.01, 200 ppm TMA Example 10

Polymerization in gas-phase fluid-bed reactor. This example illustrates the effect of cofeeding $H_2O$ with the bimetallic catalyst of Example 2 and the catalyst of Example 3 (dual catalyst feed conditions of 92% of the catalyst in Example 2 and 8% of the catalyst in Example 3). The resin's high molecular weight fraction (XHMW) was reduced with 0.2 ppm of $H_2O$.

| $H_2O$, ppm* | Density (g/cc) | FI | % Increase in FI | MFR | XHMW | Cat. Productivity (lb/lb) |
|---|---|---|---|---|---|---|
| 0 | 0.948 | 5.3 | 0 | 86 | 0.58 | 3000 |
| 0.2 | 0.947 | 10.3 | 94 | 103 | 0.52 | 3300 |

Based on ethylene feed, measured by a Du-Pont moisture analyzer. Constant: Reactor Temperature=95° C., Ethylene Partial Pressure=180 psi, $H_2/C_2$=0.008, 200 ppm TMA.

Example 11

Polymerization in gas-phase fluid-bed reactor. This example illustrates the effect of cofeeding $CO_3$ with the bimetallic catalyst of Example 2 and the catalyst of Example 3 (dual catalyst feed consisting of 90% of the catalyst of Example 2 and 10% of the catalyst of Example 3) with 2 ppm of $CO_2$ in the ethylene feed.

| $CO_2$ ppm | Density (g/cc) | FI | % Increase in FI | MFR | XHMW | $FI_{hmw}$ | $MI_{hmw}$ | Catalyst Productivity lb/lb |
|---|---|---|---|---|---|---|---|---|
| 0 | 0.947 | 5.5 | 0 | 84 | 0.59 | 0.6 | 1950 | 3600 |
| 2 | 0.947 | 7.8 | 42 | 94 | 0.55 | 0.6 | 7742 | 3360 |

What is claimed is:

1. A process for controlling the relative amount of a high molecular weight component and a low molecular weight component in a bimodal molecular weight distribution resin or a broad molecular weight distribution resin which comprises said high molecular weight component and said low molecular weight component, said process comprising contacting a feed comprising ethylene, under ethylene polymerization conditions, with a catalyst comprising a support containing two sources of transition metals, wherein the catalyst comprises a dry, anhydrous, support containing composition comprising an activated metallocene compound of a transition metal and a non-metallocene transition metal compound, wherein the support is the reaction product of
(1) silica having OH groups, impregnated with RMgR', wherein each of R and R' is alkyl of 4 to 10 carbon atoms,
wherein RMgR' is present in an amount to provide a RMgR':OH molar ratio of 0.5:1 to 4:1; and
(2) an organic alcohol reagent having a formula R"OH, wherein R" is an alkyl group of 1 to 12 carbon atoms;
wherein said alcohol reagent is used in an amount effective to provide an alcohol/Mg molar ratio of 0.5 to 2.0;

producing said bimodal molecular weight distribution resin or a broad molecular weight distribution resin product;

introducing additional feed for said contacting with said catalyst in which the activated metallocene compound exhibits a first productivity relative to the non-metallocene transition metal compound;

adding an amount of a reagent selected from the group consisting of water, carbon dioxide and admixtures thereof,
wherein the amount of reagent is effective to alter the first productivity relative to the non-metallocene transition metal compound; and recovering a modified product which has a second relative ratio of said high molecular weight component and said low molecular weight component which second relative ratio differs from said relative amount.

2. The process of claim 1 wherein the amount of reagent is effective to decrease the productivity of the non-metallocene transition metal compound.

3. The process of claim 2, wherein the reagent selected from the group consisting of water, carbon dioxide and admixtures thereof effects a decrease in the amount of the high molecular weight component in the resin.

4. The process of claim 1, which further comprises cofeeding a composition containing a single catalyst component which comprises silica and a metallocene activated with an aluminoxane wherein the amount of metallocene on the carrier ranges, on a transition metal elemental basis, from 0.001 to 10 weight percent based on the weight of said single catalyst component.

5. A process for increasing the FI of bimodal molecular weight distribution resin or a broad molecular weight distribution resin of ethylene which comprises a high molecular weight component and a low molecular weight component, by decreasing the relative amount of a high molecular weight component, said process comprising contacting a feed comprising ethylene, under ethylene polymerization conditions, with a catalyst comprising a support and two sources of transition metals, wherein the catalyst comprises a dry, anhydrous, support containing composition comprising an activated metallocene compound of a transition metal and a non-metallocene transition metal compound, wherein the support is the reaction product of
(1) silica having OH groups, impregnated with RMgR', wherein each of R and R' is an alkyl group of 4 to 10 carbon atoms,
wherein RMgR' is present in an amount to provide a RMgR':OH molar ratio of 0.5:1 to 4:1; and
(2) an organic alcohol reagent having a formula R"OH, wherein R" is an alkyl group of 1 to 12 carbon atoms;
wherein said alcohol reagent is used in an amount effective to provide an alcohol/Mg molar ratio of 0.5 to 2.0;

producing bimodal molecular weight distribution resin or a broad molecular weight distribution resin each of which is further characterized as unmodified;

introducing additional feed for said contacting with said catalyst;

adding an amount of a reagent selected from the group consisting of water, carbon dioxide and admixtures thereof,
wherein the amount of reagent is effective to alter the first productivity relative to the non-metallocene transition metal compound;
wherein the amount ranges from 0–20 ppm $H_2O$ based on ethylene; 0–10 ppm $CO_2$ based on ethylene; and recovering a modified product which has a second relative ratio of said high molecular weight component to said low molecular weight component which second relative ratio is less than the corresponding ratio in said unmodified bimodal molecular weight distribution resin or a broad molecular weight distribution resin.

6. A process for increasing the FI of bimodal molecular weight distribution resin or a broad molecular weight distribution resin of ethylene which comprises a high molecular weight component and a low molecular weight component, by decreasing the relative amount of said high molecular weight component, said process comprising contacting a feed comprising ethylene, under ethylene polymerization conditions, with a catalyst comprising a support and two sources of transition metals, wherein the catalyst comprises a dry, anhydrous, support containing composition comprising an activated metallocene compound of a transition metal and a non-metallocene transition metal compound, wherein the support is the reaction product of
(1) silica having OH groups, impregnated with RMgR', wherein each of R and R' is an alkyl group of 4 to 10 carbon atoms,
wherein RMgR' is present in an amount to provide a RMgR':OH molar ratio of 0.5:1 to 4:1; and
(2) an organic alcohol reagent having a formula R"OH, wherein R" is an alkyl group of 1 to 12 carbon atoms;
wherein said alcohol reagent is used in an amount effective to provide an alcohol/Mg molar ratio of 0.5 to 2.0;

producing bimodal molecular weight distribution resin or a broad molecular weight distribution resin unmodified product;

introducing additional feed for said contacting with said catalyst;

adding an amount of a reagent selected from the group consisting of water, carbon dioxide and admixtures thereof,
wherein the amount of reagent ranges from 0.1 to 1000 ppm $H_2O$ based on ethylene; 0.1 to 50 ppm $CO_2$ based on ethylene; and recovering a modified product which has an FI that is at least 10 percent higher than that of the unmodified product.

7. The process of claim 1, wherein the reagent selected from the group consisting of water, carbon dioxide and admixtures thereof comprises carbon dioxide.

8. The process of claim 7, wherein the amount of carbon dioxide ranges from 0.1 to 50 ppm based on ethylene.

9. The process of claim 1, wherein the catalyst is free of water.

10. The process of claim 1, wherein the catalyst comprises a cocatalyst which is free of alumoxane and free of water and free of oxygen containing oligomers and polymers of aluminum alkyl compound.

11. The process of claim 9, wherein the catalyst comprises a cocatalyst which is free of alumoxane and free of water and free of oxygen containing oligomers and polymers of aluminum alkyl compound.

12. The process of claim 1, wherein the reagent selected from the group consisting of water, carbon dioxide and admixtures thereof is water and is added in amount ranging from 0.1 to 50 ppm based on ethylene.

13. The process of claim 9, wherein the reagent selected from the group consisting of water, carbon dioxide and admixtures thereof is water and is added in amount ranging from 0.1 to 50 ppm based on ethylene.

14. The process of claim 10, wherein the reagent selected from the group consisting of water, carbon dioxide and admixtures thereof is water and is added in amount ranging from 0.1 to 50 ppm based on ethylene.

15. The process of claim 5, wherein the catalyst is free of water.

16. The process of claim 5, wherein the catalyst comprises a cocatalyst which is free of alumoxane and free of water and free of oxygen containing oligomers and polymers of aluminum alkyl compound.

17. The process of claim 15, wherein the catalyst comprises a cocatalyst which is free of alumoxane and free of water and free of oxygen containing oligomers and polymers of aluminum alkyl compound.

18. The process of claim 5, wherein the reagent selected from the group consisting of water, carbon dioxide and admixtures thereof is water.

19. The process of claim 17, wherein the reagent selected from the group consisting of water, carbon dioxide and admixtures thereof is water and is added in amount ranging from 0.1 to 50 ppm based on ethylene.

20. The process of claim 7, wherein the amount of carbon dioxide ranges from 0.1 to 50 ppm based on ethylene.

21. The process of claim 6, wherein the reagent selected from the group consisting of water, carbon dioxide and admixtures thereof comprises carbon dioxide.

22. The process of claim 6, wherein the catalyst is free of water.

23. The process of claim 6, wherein the catalyst comprises a cocatalyst which is free of alumoxane and free of water and free of oxygen containing oligomers and polymers of aluminum alkyl compound.

24. The process of claim 22, wherein the catalyst comprises a cocatalyst which is free of alumoxane and free of water and free of oxygen containing oligomers and polymers of aluminum alkyl compound.

25. The process of claim 6, wherein the reagent selected from the group consisting of water, carbon dioxide and admixtures thereof is water and is added in amount ranging from 0.1 to 50 ppm based on ethylene.

26. The process of claim 23, wherein the reagent selected from the group consisting of water, carbon dioxide and admixtures thereof is water and is added in amount ranging from 0.1 to 50 ppm based on ethylene.

27. The process of claim 24, wherein the reagent selected from the group consisting of water, carbon dioxide and admixtures thereof is water and is added in amount ranging from 0.1 to 50 ppm based on ethylene.

28. The process of claim 1, which is undertaken in the gas phase.

29. The process of claim 5, which is undertaken in the gas phase.

30. The process of claim 6, which is undertaken in the gas phase.

* * * * *

UNITED STATES PATENT AND TRADEMARK OFFICE
CERTIFICATE OF CORRECTION

PATENT NO. : 5,525,678

DATED : June 11, 1996

INVENTOR(S) : Robert I. Mink, et al.

It is certified that error appears in the above-identified patent and that said Letters Patent is hereby corrected as shown below:

Col. 17, line 33, insert --of the high molecular weight component and the low molecular weight component-- before the period.

Col. 17, line 34, insert --selected from the group consisting of water, carbon dioxide and admixtures thereof-- after "reagent".

Signed and Sealed this

Twenty-second Day of October, 1996

*Attest:*

BRUCE LEHMAN

*Attesting Officer*     *Commissioner of Patents and Trademarks*